United States Patent
Van Tuel et al.

(10) Patent No.: US 10,232,323 B2
(45) Date of Patent: Mar. 19, 2019

(54) MEMBRANES FOR DEWATERING ACID MIXTURES

(71) Applicant: Stichting Energieonderzoek Centrum Nederland, Petten (NL)

(72) Inventors: Marc Matheus Antonius Van Tuel, Petten (NL); Maria Dirkje Anna Rietkerk, Petten (NL); Henk Martin Van Veen, Petten (NL); Jaap Ferdinand Vente, Petten (NL); Johannis Pieter Overbeek, Petten (NL)

(73) Assignee: STICHTING ENERGIEONDERZOEK CENTRUM NEDERLAND, Petten (NL)

( * ) Notice: Subject to any disclaimer, the term of this patent is extended or adjusted under 35 U.S.C. 154(b) by 867 days.

(21) Appl. No.: 14/420,273

(22) PCT Filed: Aug. 9, 2013

(86) PCT No.: PCT/NL2013/050589
§ 371 (c)(1),
(2) Date: Feb. 6, 2015

(87) PCT Pub. No.: WO2014/025259
PCT Pub. Date: Feb. 13, 2014

(65) Prior Publication Data
US 2015/0217240 A1    Aug. 6, 2015

(30) Foreign Application Priority Data
Aug. 9, 2012  (NL) ..................................... 2009306

(51) Int. Cl.
B01D 71/70    (2006.01)
B01D 61/36    (2006.01)
(Continued)

(52) U.S. Cl.
CPC .......... B01D 71/70 (2013.01); B01D 61/147 (2013.01); B01D 61/362 (2013.01);
(Continued)

(58) Field of Classification Search
CPC ...... B01D 71/70; B01D 61/147; B01D 69/10; B01D 67/0095; B01D 67/0048;
(Continued)

(56) References Cited

U.S. PATENT DOCUMENTS 7,045,062 B1    5/2006  Aminabhavi et al.
2002/0142172 A1  10/2002  Brinker et al.
(Continued)

FOREIGN PATENT DOCUMENTS

WO    WO-2007/081212 A1    7/2007
WO    WO-2010/008283        1/2010

OTHER PUBLICATIONS

Aminabhavi, et al. "Prevaporation separation of water-acetic acid mixtures using polymeric membranes" Designed Monomers & Polymers (2003) vol. 6, No. 3, pp. 211-236.
(Continued)

*Primary Examiner* — Taiwo Oladapo
(74) *Attorney, Agent, or Firm* — Gilberto M. Villacorta; Sunit Talapatra; Foley & Lardner LLP (57) ABSTRACT

The invention provides a membrane suitable for dewatering acidic mixtures, comprising a bridged organosilica directly applied on a macroporous support in the absence of an intermediate mesoporous or finer layer. The bridged organic silica comprises divalent $C_1$-$C_9$ organic groups $A^2$ and/or trivalent $C_1$-$C_9$ organic groups $A^3$ directly bound to the silicon atoms of the organosilica. In particular, the membrane comprises bis-silylmethane or bis-silylethane groups. The membranes effectively separate water from acidic mix-
(Continued)

tures at high temperatures and without decrease in performance for at least several months.

24 Claims, 4 Drawing Sheets (51) Int. Cl.
- B01D 67/00 (2006.01)
- B01D 69/14 (2006.01)
- C08G 77/50 (2006.01)
- B01D 61/14 (2006.01)
- B01D 69/10 (2006.01)
- B01D 71/02 (2006.01)

(52) U.S. Cl.
CPC ..... B01D 67/0048 (2013.01); B01D 67/0079 (2013.01); B01D 67/0095 (2013.01); B01D 69/10 (2013.01); B01D 69/148 (2013.01); C08G 77/50 (2013.01); B01D 71/027 (2013.01); B01D 2325/22 (2013.01); B01D 2325/30 (2013.01); Y02P 20/582 (2015.11)

(58) Field of Classification Search
CPC .............. B01D 67/0079; B01D 61/362; B01D 69/148; B01D 2325/30; B01D 2325/22; B01D 71/027; C08G 77/50; Y02P 20/582
See application file for complete search history.

(56) References Cited

U.S. PATENT DOCUMENTS

2009/0246114 A1* 10/2009 Sah ..................... B01D 61/362
                                                                423/352
2011/0259825 A1    10/2011 Kreiter et al.

OTHER PUBLICATIONS

Campaniello et al., "Long-term pervaporation performance of microporous methylated silica membranes," Chemical Communications (The Royal Society of Chemistry), (2004) pp. 834-835.
Castricum et al. "High-performance hybrid pervaporation membranes with superior hydrothermal and acid stability" J. Membr. Sci. (2008) vol. 324, pp. 111-118.
Castricum et al., "Hybrid ceramic nanosieves: stabilizing nanopores with organic links," Chem. Commun., The Royal Society of Chemistry, 2008, pp. 1103-1105.
De La Iglesia et al. "Continuous zeolite membrane reactor for esterification of ethanol and acetic acid" Chemical Engineering Journal (2007) vol. 131, pp. 35-39.
International Search Report in PCT/NL2013/050589 dated Oct. 7, 2013.
Ishida et al. "A Study of Vapor Permeation and Pervaporation of Acetic Acid/Water Mixtures by Porous Silica Membranes" Journal of Chemical Engineering Japan (2005) vol. 38, No. 11, pp. 903-907.
Khajavi et al. "Performance of hydroxyl sodalite membranes as absolute water selective materials under acidic and basic conditions" Journal of Membrane Science (2010) vol. 356, pp. 1-6.
Kreiter et al. "High-temperature pervaporation performance of ceramic-supported polyimide membranes in the dehydration of alcohols", J. Membrane Science (2008) vol. 319, pp. 126-132.
Kreiter et al., "Stable Hybrid Silica Nanosieve Membranes for the Dehydratation of Lower Alcohols," ChemSusChem, vol. 2, 2009, pp. 158-160.
Masuda et al. "Preparation of hydrophilic and acid-proof silicalite-1 zeolite membrane and its application to selective separation of water from water solutions of concentrated acetic acid by pervaporation" Separation and Purification Technology (2003) vol. 32, pp. 181-189.
Tsai et al. "Dual-layer asymmetric microporous silica membranes", J. Membrane Science (2000) vol. 169, pp. 255-268.
Tsuru, et al. "Pervaporation of acetic acid aqueous solutions by organosilica membranes", Journal of Membrane Science (2012) vol. 421-422, pp. 25-31.
Van Veen, et al. "Pushing membrane stability boundaries with HybSi pervaporation membranes", Journal of Membrane Science (2011) vol. 380, pp. 124-131.
Zhou et al. "Pervaporation Using Hollow-Fiber Membranes for Dehydrating Acetic Acid and Water Mixtures", Industrial & Engineering Chemistry Research (2006) vol. 45, pp. 1787-1796.
Zhou et al. "Study of thermal annealing on Matrimid fiber performance in pervaporation of acetic acid and water mixtures" Polymer (2006) vol. 47, pp. 280-288.

* cited by examiner

MEMBRANES FOR DEWATERING ACID MIXTURES

CROSS-REFERENCE TO RELATED APPLICATIONS

This application is the National Phase of International Patent Application No. PCT/NL2013/050589, filed Aug. 9, 2013, published as WO 2014/025259, which claims priority to Netherland Application No. 2009306, filed Aug. 9, 2012. The contents of which is herein incorporated by reference in its entirety.

The invention relates to the manufacture of microporous organic-inorganic hybrid membranes suitable for separating water or methanol from mixtures, with a specific focus on acidic mixtures, such that water or methanol is the fastest permeating component. The invention further relates to the use of these membranes for separation of water or methanol from mixtures containing organic or inorganic acids.

BACKGROUND

Recent investigations have shown that organic-inorganic hybrid silica membranes based on the precursors 1,2-bis (triethoxysilyl)methane (BTESM), or 1,2-bis(triethoxysilyl) ethane (BTESE) in the optional presence of methyltriethoxysilane (MTES) are suitable for the separation of water from several organic solvents, including n-butanol (Castricum et al. 2008-a, Sah et al., WO 2007/081212, Kreiter et al. WO 2010/008283). The long-term stability of these membranes was unprecedented. Membrane life-times up to 1000 days were demonstrated at an operating temperature of 150° C. (Van Veen et al. 2011). It was known that inorganic silica and methylated silica membranes do not survive at these temperatures (Campaniello et al. 2004). The performance of organic-inorganic hybrid silica is not affected by traces of nitric acid in a butanol/water mixture (Castricum et al. 2008-b) and acetic acid in an ethanol/water mixture (Kreiter et al, 2009; WO2010/008283).

Several authors have reported the separation of acid-water mixtures using pervaporation. In these reports water removal from acetic acid using pervaporation membranes is a key example process (Aminabhavi et al. 2003; U.S. Pat. No. 7,045,062).

Applications with a high organic acid concentration include esterification reactions in which e.g. acetic acid reacts with ethanol. In situ removal of the by-product water leads to increased conversion and higher product quality (Iglesia et al. 2007).

Amorphous silica membranes are selective for water separation from acetic acid at different mole fractions (Ishida et al. 2006). Although the membrane performance was demonstrated at individual compositions, the long-term performance and stability of these inorganic silica membranes were not demonstrated. Moreover, it is well-known that amorphous silica-based materials change structure in the presence of water and acid. This is due to proton-catalysed hydrolysis and condensation processes, the rates of which are related to, amongst other factors, the acid concentration. For pervaporation membranes based on silica and methylated silica, membrane performance thus declines within several days of operation in hydro-organic mixtures, even at temperatures of 95° C. and lower (Campaniello et al. 2004). This decline in performance can be recognised by a decrease in selectivity and separation factor that is often accompanied or preceded by an increase in water and organic solvent flux.

Zeolite membranes such as Silicalite-1 applied in the separation of water from acetic acid show low fluxes and limited separation factors, especially at lower water concentrations (Masuda et al. 2003). For example, the separation factor of this Silicalite-1 membrane (calculated according to equation 1) found for a mixture of 90/10 wt % acetic acid/water is around 10. This zeolite membrane is stable for 24 h of operation at 70-80° C. The stability over longer periods of time is unknown. Zeolite A in particular is highly unstable in the presence of acids, as was demonstrated by membrane reactor experiments in the esterification of acetic acid (Iglesia et al. 2007). The same authors describe mordenite membranes having an acetic acid/water separation factor that reaches a maximum of 98 during a total measuring time of 5 days at 80° C., starting from an equimolar mixture of acetic acid and ethanol. Related work demonstrates that higher concentrations of acetic acid (HAc) are detrimental for the separation factor. At a feed concentration of HAc/ $H_2O$ 90/10 wt % the separation factor drops to about 50. Application temperatures beyond 90° C. were not reported. A further well known disadvantage of Zeolite A is the limited stability in hot liquid water, limiting the application of the membrane at high water contents in any mixture including that of water with an alcohol or an organic acid.

Another zeolite membrane is hydroxy sodalite. This membrane was stable at high water content, e.g. at HAc/$H_2O$ 20/80 mol %, for at least 15 days. However, when the acid concentration was increased to HAc/$H_2O$ 31/69 mol %, the membrane failed within 20 hours. (Khajavi et al, 2010).

The capability of separating water from acetic acid has been reported for several polymer membranes (Aminabhavi et al. 2003). Some examples are polyvinyl alcohol (PVA), PVA blends, and cross-linked PVA membranes. All of these PVA-based membranes are limited in application temperature to about 80° C. because of the glass transition temperature of the polymer at 85° C. In addition, acetic acid is a strong plasticizer for PVA, especially at higher acetic acid mole fractions (Aminabhavi et al. 2003). Alternative polymer materials suffer from the same glass transition limit in the region of 70-85° C. Polyimide membranes are suitable for higher temperature applications (Zhou et al. 2006-a, 2006-b). However, the separation factors obtained with a native polyimide membrane based on the polymer Matrimid are limited to 15-35. The separation factor can be increased to 95 by a heat treatment of the Matrimid membrane, but only at the expense of water flux, which is lowered by a factor of 3 to 1.65 kg/$m^2 \cdot h$. In addition, Matrimid and polyimides in general are not sufficiently stable in the presence of water even in the absence of an acid (Kreiter et al. 2008).

Tsuru et al. 2012 disclose an organic-inorganic hybrid silica membrane produced by first coating an α-alumina support with titania, followed by coating with silica-zirconia and finally coating with BTESE. The resulting microporous membrane appears to have an intermediate titania and/or silica/zirconia layer in the order of 1 μm thick, which, according to the Knudsen diffusivity will be a microporous or mesoporous layer. After testing the membrane in dewatering acetic acid at a feed composition of HAc/$H_2O$ 90/10 wt % at 75° C. with good performance, the separation factor decreased while the water flux increased, showing an irreversible decline in membrane performance. This indicates that high temperature stability is low, although long term stability was reported at room temperature. Therefore these membranes do not appear to be suitable for dewatering of acids by pervaporation at high temperatures for periods of time relevant to the industry.

US 2002/0142172 discloses a dual-layer inorganic microporous membrane comprising a surfactant-templated intermediate layer. An intermediate mesoporous γ-alumina layer (pore size 5 nm) is always present between the macroporous substrate and the templated intermediate layer. The microporous top layer can be made from organic silanes such as bis-triethoxysilyl-ethane, but the ethane ligands embedded in the silica framework are removed by calcination at 280° C. for creating micropores. Thus the final membrane deliberately does not contain organic bridges in the silica. US 2002/0142172 does not suggest separation of water from acid or vice versa, and its membranes will be unsuitable for such separation. Tsai et al. 2000, which corresponds to US 2002/0142172, confirms the intentional removal of ethane bridges.

Thus, there is a need for hybrid inorganic-organic membranes which do not exhibit acid sensitivity even at high acid concentrations and high temperatures after prolonged periods of several weeks or months.

DESCRIPTION OF THE INVENTION

It was found surprisingly that acid-stable, hydrothermally stable membranes suitable for dewatering acidic mixtures, can be produced by applying a bridged organosilica on a macroporous support, without the need for an intermediate mesoporous or microporous layer on the macroporous support. The added advantage of this approach is that conventional materials used for producing the intermediate layers are no longer part of the membrane system. Such materials, like γ-alumina, are not resistant to concentrated acids. Thus, the weakest link in the membranes is removed according to the present invention.

The membranes can be produced by a single coating step or by multiple coating of the appropriate organosilica onto the macroporous support with intermittent drying until the membranes are essentially microporous.

As used here, terms "microporous", "mesoporous" and macroporous" follow the IUPAC definition for these terms: "mesopores" means pores of between 2 nm and 50 nm, smaller pores are "micropores", and larger pores are "macropores".

The hybrid organic-inorganic silica membranes of the invention can be used for the selective removal of water from organic solvents, dilute acids and concentrated acids based on the difference in molecular size, and optionally assisted by a difference in affinity. In contrast to other ceramic membranes, the membranes to be used in the present invention show exceptional stability in acid/water mixtures over the whole composition range, thus from 100/0 w/w to 0/100 w/w, with an emphasis on the economically interesting region from 99/1 w/w to 80/20 w/w. For mixtures also containing an alcohol, the (acid+alcohol)/water mixtures may range from 100/0 w/w to 0/100 w/w, preferably from 99/1 to 60/40 w/w, with the acid/alcohol ratio ranging from 1:0 to 1:9, preferably 3:1 to 1:3 w/w.

For esterification reactions, the acid/alcohol ratio is most preferably between 1:1 and 1:2 w/w. All these mixtures will be dewatered with the membranes of the current invention until they are essential free of water, or have reached the requirements for further processing or unitization. Often the acid to alcohol ratio in esterification reactions is given in molar ratios. In this terminology the range of acid:alcohol ratios of interest becomes 9:1 to 1:9 m/m, more preferably 2:1 to 1:4 m/m and most preferably 1:1 to 1:3 m/m.

The membranes of the invention have a separation factor for a 90:10 mixture of acetic acid/water of at least 100, more preferably at least 200, in particular at least 300 at the critical high temperatures of e.g. 5° C. below the boiling point of the mixture or higher. In particular these minimum values apply at 100° C. The separation factors for other acid/water mixtures are dependent on the kinetic diameter of the specific acid used, and will in general be higher. Lower values are expected to be possible for e.g. formic acid. The high separation factors can also be reached at lower temperatures. For all these separations, the separation factor, α, is defined as:

$$\alpha = \frac{Y_w/Y_a}{X_w/X_a} \qquad (1)$$

Where Y and X are the weight fractions of water (w) and acid (a) in the permeate and feed solutions, respectively. In the case of ternary mixture the (a) should be taken as the sum of the fractions of the organic components, in particular alcohol and organic acid.

The membranes of the invention are microporous hybrid membranes based on silica and contain bridging organic links. Preferably, the organosilica of the microporous membranes has the formula $Si_{(1-x)}M_xA^1_iA^2_jA^3_kO_{1.25-1.85}$, wherein:

M is one or more metals selected as described below, $A^1$ is a monovalent $C_1$-$C_9$ hydrocarbyl group, optionally substituted with fluorine;

$A^2$ is a divalent organic group having the formula —$C_mH_n$—;

$A^3$ is a trivalent organic group having the formula —$C_mH_{(n-1)}$<, wherein the character "<" represents two binding sites;

i=0-0.67;

j=0-0.75;

k=0-0.34, 0.5<i+2j+3k<1.1; and 2j+3k>0.3;

m=1-9 and n=2(m−p) and 0≤p<m, wherein the values m, n and p may be different between formulas $A^1$ and $A^2$;

x=0-0.2.

In preferred embodiments of the membrane as defined above, one or more of the following values apply, in the formula $Si_{(1-x)}M_xA^1_iA^2_jA^3_kO_{1.45-1.85}$:

$A^1$ is a monovalent $C_1$-$C_6$ hydrocarbyl group, preferably a $C_1$-$C_4$ alkyl group, more preferably methyl or ethyl, most preferably methyl;

$A^2$ is a divalent organic group having the formula —$C_mH_n$—;

$A^3$ is a trivalent organic group having the formula —$C_mH_{(n-1)}$<;

i=0-0.33, preferably 0-0.2;

j=0.25-0.5, preferably 0.3-0.5, more preferably 0.4-0.5, most preferably 0.45-0.5;

k=0-0.17, preferably 0-0.1, m=1-6, preferably 1-4, more preferably m=1 or 2;

x=0-0.1.

The monovalent group $A^1$ may be represented by the formula —$C_qH_rF_s$, wherein q=1-9, and r+s=2(q−t)+1 and 0≤t<q. Preferably, q=1-4, as defined above, and/or s=0, and/or t=0. In the formulas —$C_mH_n$—, —$C_mH_{(n-1)}$<, and —$C_qH_rF_s$ for $A^1$, $A^2$ and $A^3$, respectively, the indicators p and t stand for an unsaturation or cyclic structure. Where $A^1$, $A^2$ or $A^3$ contains three or more carbon atoms, one non-terminal carbon atom per three or more carbon atoms may be replaced by a heteroatom, in particular O, S or N. Also, within $A^1$, $A^2$ and $A^3$, one or more hydrogen atoms may be replaced by fluorine atoms. Taking into account heteroatoms in the chain, the formula —$C_mH_n$— can also be represented as —$C_mH_{n'}$—$(Z-C_{m''}H_{n''})_y$—$Z$—$C_{m'''}$—$H_{n'''}$—, wherein m', m" and m''' are independently 1-3, n', n", n''' are 2m'–p, 2m"–p, 2m'''–p, preferably 2m', 2m", 2m''' respectively, Z is O, S or NR, R is $C_1$-$C_4$ alkyl, preferably methyl, and y is 0 or 1. Similarly for the formulas —$C_mH_{(n-1)}$< and —$C_qH_rF$; for example —$C_mH_{n'}$—$Z$—$C_{m''}H_{n''}$— for —$C_mH_{(n-1)}$<, wherein Z is $N(C_{m'''}H_{n'''})$ and m', m", m''', n', n" and n''' are as defined above.

Examples for group $A^1$ include methyl, trifluoromethyl, ethyl, 2,2,2-trifluoro-ethyl, propyl, butyl, butenyl, pentyl, hexyl, phenyl, benzyl, p-isopropylphenyl, etc. If present, the preferred monovalent group is methyl or ethyl. In the case that both bridging ($A^2$ and/or $A^3$) and terminating groups ($A^1$) are present, the ratio between the number of divalent (or trivalent) and monovalent moieties lies preferably between 10:1 and 1:10, more preferably between 8:1 and 1:5, most preferably between 5:1 and 1:2 and ideally around 1:1.

Alternatively, the presence of bridging groups $A^2$ can be defined with reference to the oxygen bridges in non-modified silica. Thus, on average between 0.6 and 1.1, more preferably 0.8-1.05, most preferably 0.9-1.0 of the links $A^2$ (Si—$C_mH_n$—Si) is present on every three Si—O—Si links in the organosilica.

Examples for group $A^2$ (=$C_mH_n$) include methylene (—$CH_2$—), ethylidene (—$CH(CH_3)$—), ethylene (—$CH_2CH_2$—), vinylene (—CH=CH—), tetrafluoroethylene (—$CF_2CF_2$—), propylene (—$CH_2CH_2CH_2$—), isopropylene (—$CH_2CH(CH_3)$—), isopropylidene (—$C(CH_3)_2$—), 2-oxa-propylene (oxydimethylene, —$CH_2OCH_2$—), 2-thia-propylene (thio-dimethylene, —$CH_2SCH_2$—), butylene (—$(CH_2)_4$—), 3-oxa-pentylene (—$CH_2CH_2OCH_2CH_2$—), octylene, cyclohexylene, (m- or p-)phenylene, phenylenedimethylene (—$CH_2C_6H_4CH_2$—), piperazine-1,4-diyl-dimethylene, etc.

Examples of group $A^3$ (—$C_mH_{(n-1)}$<) include methine (—CH), 2-ylomethylene-propane-1,3-diyl (—$CH_2$—CH($CH_2$—$)_2$), benzene-1,3,5-triyl, 1,3,5-triazine-2,4,6-triyl, benzene-1,3,5-tris(ylmethylene), etc.

Optionally, the silicon atom in the above description may partially be replaced by any metal atom, or mixture of any metal atoms, "M", especially any metal other than alkali metals and alkaline earth metals. In particular, the metal is selected from row 3 (Al), row 4 (Sc to Ge), row 5 (Y to Sb), the lanthanides (La to Lu) and row 6 (Hf to Bi). Specific examples of metals that may be of interest include:

3d metals such as Co, Fe and Ni,
4d metals such as Ag and Pd,
main group 3 elements such as Y, and one of the lanthanides, such as La, Nd, Gd and Yb,
main group 4 elements such as Zr, Hf,
main group 5 elements such as Nb, Ta
and other miscellaneous metals including Al, Ga, Ge, and Sn or combinations thereof.

It is preferred that these other metals, if present, are present at a ratio to silicon atoms of 0-40:60-100, more preferably 0-20:80-100, most preferably 0-10:90-100.

The membranes of the present invention can be prepared by coating a sol prepared from the appropriate organic silica precursor directly on a macroporous support. This is in contrast to the conventional methods of producing inorganic and organic (hybrid) silica membranes, which involve the application on an intermediate mesoporous support layer, such as gamma-alumina as described in WO 2007/081212, WO 2010/008283 and JP 2004-275943. The same references give ample information on the preparation of the sol from the precursor. The commonly held perception by those skilled in the art is that a mesoporous or finer support is essential for the fabrication of an effective membrane suitable for the separation of water or methanol from any mixture. Although Kreiter et al. 2009, WO 2010/008283 and Van Veen et al. 2011 report that the microporous hybrid silica membranes can be used for the removal of water from alcohols containing minor amounts of up to 15 wt. % of organic acid, and 0.05 wt % of an inorganic acid, it could not be expected that such membranes would be stable against higher concentrations of acids. To the contrary, it was shown that the selectivity of the membranes in de dehydration pervaporation of a mixture containing 5 wt % $H_2O$ and 0.5 wt % $HNO_3$ in n-butanol at 95° C. decreased to unacceptably low values within 60 to 100 days (Van Veen et al. 2011). The same reference shows that the membrane loses selectivity within a couple of days when exposed to a mixture of 5 wt % $H_2O$ and 0.1 wt % methanesulfonic acid in n-butanol at 95° C.

The membranes can be produced by the sol-gel techniques as described e.g. in WO 2007/081212 and Castricum et al. 2008. Contrary to the methods described therein, however, the sol of the organosilica precursor is coated directly on a macroporous support and subsequently dried and preferably calcined. In a preferred embodiment, the coating, drying and calcining is then repeated at least once, until a microporous top layer is obtained.

In short, the membranes of the invention can be produced by a process comprising:

(a) hydrolysing a silicon alkoxide of the formula (II) or (III)

$$(RO)_3Si\text{—}C_mH_n\text{—}Si(OR)_3, \qquad (II)$$

$$(RO)_3Si\text{—}C_mH_{(n-1)}[Si(OR)_3]_2, \qquad (III)$$

wherein R is $C_1$-$C_4$-alkyl, m=1-9 and n=2(m–p) and 0≤p<m, as further defined above, in an organic solvent to produce a sol of modified silicon (hydr)oxide;

(b) depositing modified silicon (hydr)oxide from said sol onto a macroporous support;

(c) drying the support with the deposit and preferably calcining at a temperature between 100 and 500° C., (d) optionally repeating steps (a), (b) and (c) once, preferably twice, and optionally thrice or more often, and (e) calcining the membrane with the support if no calcining was incorporated in step (c).

As described above with reference to the membranes, one or more non-terminal (i.e. not silicon-linked) carbon atoms in the organic bridging groups $C_mH_n$ and $C_mH_{(n-1)}$, in the $A^2$ or $A^3$ moieties, may be replaced by a heteroatom. Thus, for example, silanes of the formulas:

$$(RO)_3Si\text{—}C_{m'}H_{2m'}\text{—}O\text{—}C_{m''}H_{2m''}\text{—}Si(OR)_3 \qquad (IIa)$$

or $$(RO)_3Si\text{—}C_{m'}H_{2m'}\text{—}N[C_{m''}H_{2m''}\text{—}Si(OR)_3]_2 \qquad (IIIa)$$

(with m', m"=e.g. 1-2) are also suitable precursors. Groups $C_mH_n$ can also be introduced using trisilanes or polysilanes, e.g. of the following formula:

$$(RO)_3Si\text{—}C_{m'}H_{2m'}\text{—}Si(OR)_2\text{—}C_{m''}H_{2m''}\text{—}Si(OR)_3 \qquad (IIb)$$

$$[(RO)_3Si\text{—}C_{m'}H_{2m'}\text{—}]_2Si[\text{—}C_{m''}H_{2m''}\text{—}Si(OR)_3]_2 \qquad (IIc)$$

in the hydrolysis step (a).

In addition to the silicon alkoxides with formulas (II) and (III), (or (IIa), (IIb), (IIc), (IIIa)), monoalkyl silicon alkoxides having the formula $$(RO)_3Si—C_qH_rF_s \qquad (I)$$

wherein R can be $C_1$-$C_4$ alkoxy, especially ethoxy, q=1-9, and r+s=2(q−t)+1 and 0≤t<q as further defined above, or tetra-alkoxy-silanes (R'O)$_4$Si, wherein R' can be the same as R, especially tetraethoxysilane (TEOS), can be co-hydrolysed to modify the organosilica composition, resulting in the presence of alkyltrioxysilane groups and/or tetraoxy silane groups.

Where levels of other metals are desired in the organosilica membranes, these can be introduced by co-hydrolysing the appropriate precursors, such as tetra-isopropoxy titanium, pentaethoxy niobium and the like in the appropriate (molar) ratio to the silicon precursors.

Further details of the production process for the organosilica layer of the membranes of the invention are described e.g. in WO 2007/081212 and WO 2010/-008283, which are herein incorporated by reference. The relative amounts of the precursors are selected in correspondence with the desired level of groups $A^1$, $A^2$ and $A^3$ in the organosilicon membrane.

The calcination temperature is preferably at least 150° C., more preferably at least 200° C., and preferably does not exceed 400° C., and more preferably not higher than 350° C. Most preferably, calcination temperatures are between 225 and 275° C.

The calcination steps as described above can be performed in air or preferably in oxygen depleted air, or more preferably in pure inert gasses such as nitrogen, helium, etc, in the significant absence of oxygen.

The membranes of the current invention are suitable for the same applications as the conventional supported membranes from e.g. WO 2007/081212. In addition, they are especially suitable for dewatering of organic and inorganic acids, some of which are listed in Table 1. Organic acids include carboxylic acids, sulfonic acids, phosphonic acids, phenols, tetrazoles and the like. Examples of possible carboxylic acids are formic acid, acetic acid and longer homologues and isomers, hydroxylic acids such as glycolic acid, lactic acid and citric acid, diacids such as oxalic acid, succinic acid, maleic acid, and terephthalic acid. In these examples one or more halo substituents may be present leading to chloro-, bromo- or fluoro-substituted carboxylic acids. Examples include mono-, di- and trichloroacetic acid. Examples of other organic acids include (di)nitro-phenol, 5-phenyltetrazole, methanesulfonic acid, toluenesulfonic acid, ethyl phosphonic acid and mixed acids such as 2-carboxyethyl phosphonic acid. Examples of possible inorganic acids are phosphoric and sulfuric acid and their partial salts and esters. Preferably the pKa of the acid to be separated is >0, more preferably >1, and most preferably >2 up to e.g. 5.

TABLE 1

Selected pK$_a$ values of common organic (carboxylic) and inorganic acids in water. Further examples can be found in CRC Handbook of Chemistry and Physics.

| Acid | Formula | pK$_a$ in water |
|---|---|---|
| Carboxylic acids | | |
| Propanoic acid | $CH_3CH_2COOH$ | 4.86 |
| Butanoic acid | $CH_3(CH_2)_2COOH$ | 4.83 |
| Acetic acid | $CH_3COOH$ | 4.76 |

TABLE 1-continued

Selected pK$_a$ values of common organic (carboxylic) and inorganic acids in water. Further examples can be found in CRC Handbook of Chemistry and Physics.

| Acid | Formula | pK$_a$ in water |
|---|---|---|
| Benzoic acid | $C_6H_5COOH$ | 4.21 |
| Succinic acid | $C_2H_4(COOH)_2$ | 4.16, 5.61 |
| Lactic acid | $CH_3CH(OH)COOH$ | 3.86 |
| Glycolic acid | $HOCH_2COOH$ | 3.83 |
| Formic acid | $HCOOH$ | 3.77 |
| Terephthalic acid | $C_6H_4(COOH)_2$ | 3.54, 4.46 |
| Citric acid | $C(OH)COOH(CH_2COOH)_2$ | 3.14, 5.95, 6.39 |
| Salicylic acid | $o$-HO—$C_6H_4COOH$ | 2.98 |
| Monochloroacetic acid | $CH_2ClCOOH$ | 2.87 |
| Malonic acid | $CH_2(COOH)_2$ | 2.83, 5.69 |
| Pyruvic acid | $CH_3COCOOH$ | 2.39 |
| Maleic acid | $C_2H_2(COOH)_2$ | 1.83, 6.27 |
| Oxalic acid | $(COOH)_2$ | 1.23, 4.28 |
| Dichloroacetic acid | $CHCl_2COOH$ | 1.25 |
| Trichloroacetic acid | $CCl_3COOH$ | 0.70 |
| Trifluoroacetic acid | $CF_3COOH$ | −0.3 |
| Other organic acids | | |
| 2,4-Dinitrophenol | $(NO_2)_2C_6H_3OH$ | 3.96 |
| Methanesulfonic acid | $CH_3SO_3H$ | −2.6 |
| Inorganic acids | | |
| Phosphoric acid | $H_3PO_4$ | 2.16, 7.21, 12.32 |
| Sulfurous acid | $H_2SO_3$ | 1.9, 7.21 |
| Nitric acid | $HNO_3$ | −1.3 |
| Sulfuric acid | $H_2SO_4$ | −3.0, 1.98 |
| Hydrochloric acid | $HCl$ | −8.0 |

Acid feed mixtures that can be separated with the present membranes can comprise practically any ratio of acid (for example formic, acetic, propionic, lactic or citric acid, most importantly formic and acetic acid) and water. Particularly useful feed mixtures contain 15-97 wt %, preferably 20-95 wt %, more preferably 50-90 wt % of acid and 3-70 wt %, preferably 5-50 wt. %, most preferably 10-40 wt % of water, and the retentate contains less than 3%, preferably less than 1%, most preferably less than 0.5 wt % water. These mixtures can result from the production of the acid. The acidic mixtures can also be a recycle stream of the acid in the production of another compound.

In addition to purification of acid/water mixtures, the membranes of the present invention can be used to remove water from reaction mixtures. One of the examples of such mixtures is an esterification mixture (Sanz et al. 2006). Examples of esterification reactions are the reaction between carboxylic acids such as acetic acid or propionic acid and methanol, ethanol, propanol, or longer homologues and isomers to their corresponding esters. Examples of such esters are methyl, ethyl, propyl, butyl, hexyl, or octyl acetate and related species, such as the corresponding propionates, butyrates, pentanoates, hexanoates, and longer homologues, and lactates, such as ethyl lactate. Esterification reactions of carboxylic acids and alcohols are equilibrium reactions. Removal of water leads to a shift in this equilibrium to the side of the product and consequently leads to increased conversion to the product. Therefore, removal of water using membranes of the present invention leads to improved conversion of the esterification reaction. Particular esterification mixtures subjected to the membranes of the invention can contain between 20 and 80 wt. % of an alcohol and/or an ester of the acid and the alcohol, where the alcohol/ester ratio will decrease as the reaction proceeds.

Other reactions which can be enhanced by use of the present membranes include acetalisation reactions in which an aldehyde or ketone reacts with an alcohol, and other reactions where water is formed and dehydration of the mixture increases the conversion. After removal of most or all of the water, the acetal can be easily separated from the reagents, by distillation, which can be fed back to the reactor (Agirre et al, 2012). In this reference a solid acid catalyst has been used which is compatible with a conventional membrane from e.g. WO 2010/008283. The membrane of the invention allows for the utilisation of commonly used homogeneous acid catalysts such as methanesulfonic acid etc. This type of catalyst is detrimental to the prior art membranes supported by a mesoporous layer (Van Veen, 2011).

In the exemplary embodiments described above, the reaction and membrane separation can be performed in one single device, often referred to as a "catalytic membrane reactor". In an alternative embodiment, the membrane separation step is performed in a recycle stream. After removal of the water, the product may be separated from the reagents, which are subsequently recycled to the main reactor.

As explained above, the membranes are hydrothermally stable and acid-stable, allowing the separations to be performed at any temperatures from ambient temperature to at least 190° C. Particularly useful temperatures are between 90 and 150° C.

EXAMPLES

Sol Preparation:

1,2-Bis(triethoxysilyl)ethane (BTESE, purity 96%, ABCR) and 1,2-bis(triethoxysilyl)-methane (BTESM, purity 96%, ABCR) were used as a precursor for making a sol. The required amounts of ethanol absolute, distilled water and nitric acid (65 wt %, Aldrich) were mixed and added to the precursor mixture under continuous stirring. The mixtures had a [H+]:[Si] ratio of 0.043 and a [$H_2O$]:[precursor] ratio of 6 and a [Si] concentration of 1.5 M. Finally 3.98 ml BTESE or 3.76 ml BTESM were added to 10 ml of the stock solution under continuous stirring and refluxed for 3h at 60° C.

Comparative Example

Figure 4:
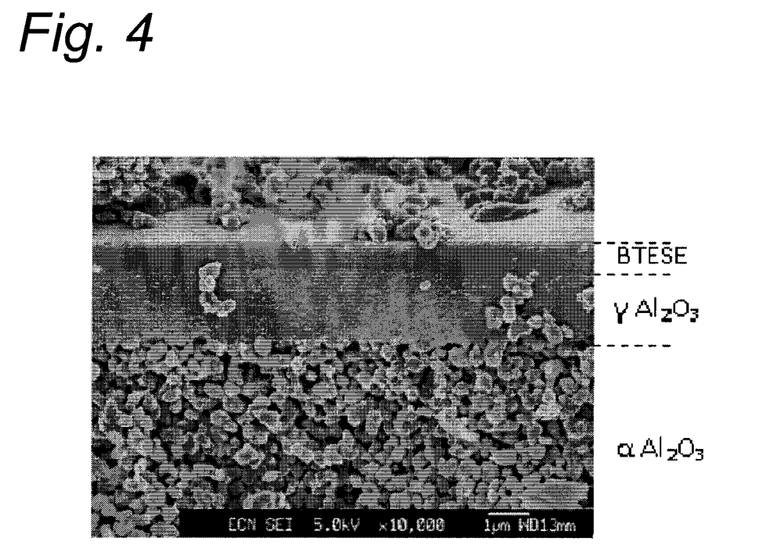
FIG. 4 shows a photograph of a prior art membrane having an intermediate gamma-alumina layer.

A sol with BTESM as described above was coated directly on a tubular mesoporous $\gamma$-$Al_2O_3$ substrate with an average pore size of 3-4 nm. After drying for 12 hours at room temperature, the membrane was exposed to a heat treatment under $N_2$ atmosphere by heating with 0.5° C./min to 250° C. with a dwell of 2h and cooling down again to room temperature with 1° C./min. Three individual BTESM membranes and one BTESE membrane were made according to Example 1 of WO 2010/008283 and tested in the dewatering of acetic acid of different compositions (70, 80 and 90 $HAc/H_2O$ w/w). The membrane subjected to a composition of $HAc/H_2O$ of 80/20 w/w lost selectivity after 21 days of operation. Three other individual membranes subjected to a similar concentration showed shorter life times. FIG. 4 shows a SEM of a tubular membrane with mesoporous $\gamma$-$Al_2O_3$ and microporous BTESE layer.

Figure 1:
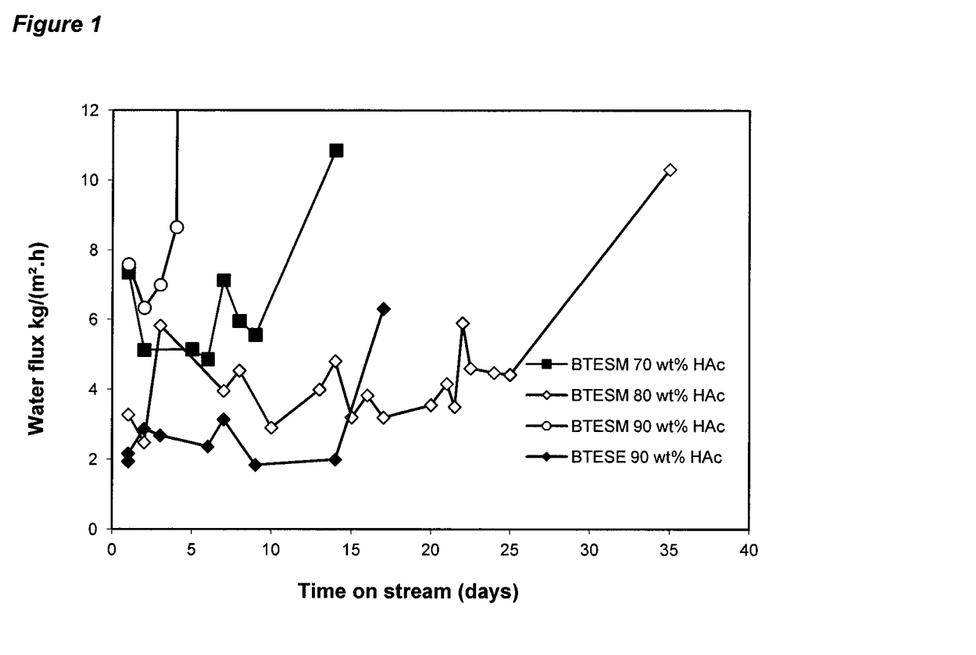
FIG. 1 shows the water flux in an endurance test in concentrated acetic acid at 100° C. of a membrane not according to the invention (having a $\gamma$-$Al_2O_3$ layer).

It can be seen in FIG. 1 that the flux increases after 5 days for BTESM and 17 days for BTESE (90/10) and after 15 days for BTESM (70/30), indicative of a structure that is opening up. Under steady performance, commonly an initial reduction is followed by a constant water flux. This is the first indication of low stability.

Figure 2:
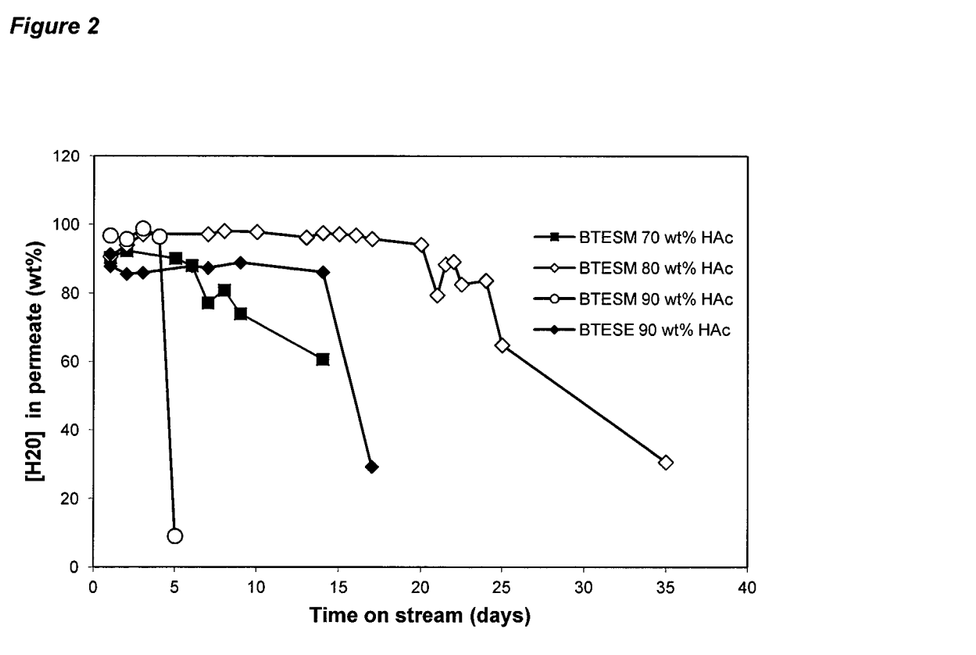
FIG. 2 shows the purity of water in the permeate using a feed of concentrated acetic acid at 100° C. separated by a membrane not according to the invention at 100° C.

FIG. 2 shows that the concentration of water in permeate resulting from 70/30, 80/20 and 90/10 w/w $HAc/H_2O$ at 100° C. decrease over time in case of BTESM and BTESE. The selectivity losses after about 4 days and 14 days (90/10), 6 days (70/30) and 24 days (80/20) is clearly shown.

Example 1

Figure 3:
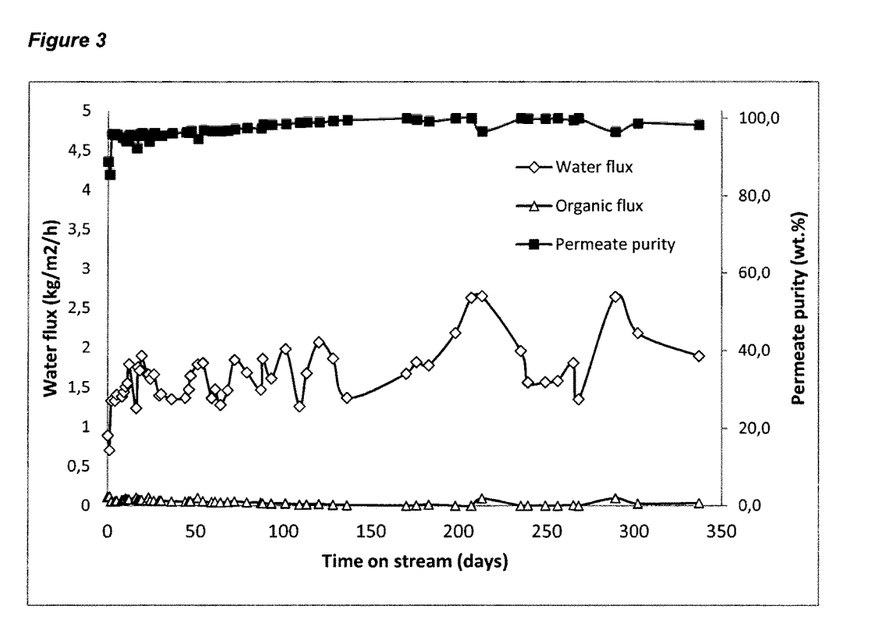
FIG. 3 show an endurance tests in concentrated acetic acid at 100° C. of a BTESE membrane according to the invention (without $\gamma$-$Al_2O_3$ layer) in 90/10 w/w $HAc/H_2O$.
Figure 5:
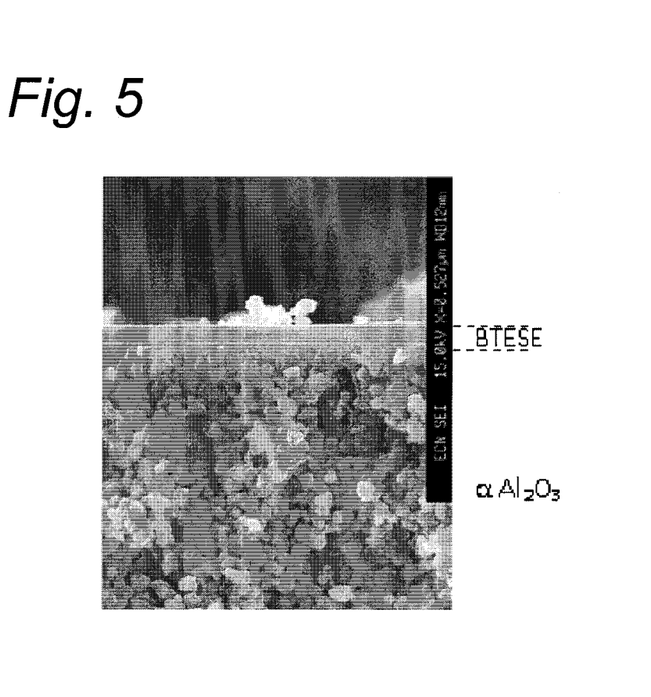
FIG. 5 shows a photograph of a membrane without intermediate layer according to the invention.

A sol with BTESE as described above was coated directly on a macroporous tubular ceramic support of $\alpha$-$Al_2O_3$ with average pore size of approximately 0.17 μm. After drying for 12 hours at room temperature, the membrane was exposed to a heat treatment under $N_2$ atmosphere by heating with 0.5° C./min to 250° C. with a dwell of 2h and cooling down again to room temperature with 1° C./min. This process was performed for a total of three times until a microporous BTESE layer was formed on top of the macro-porous support. Two individual BTESE membranes were made according to Example 1 of WO 2010/008283 (with the exception of being deposited on the $\alpha$-alumina) and were tested in dewatering of acetic acid. The configuration of a tubular membrane without intermediate $\gamma$-alumina layer is illustrated in FIG. 5. Pervaporation in mixtures of acetic acid and water of 90/10 wt % at 100° C. showed that the performance of the membrane according to the invention was unchanged after a period of more than 337 days (FIG. 3). The purity of the water in the permeate was always above 97%, and did not show any tendency to reduce over time. The separation factor increased from an initial value of over 200 to a value of over 3000 after 180 days. The procedure was repeated with a second membrane and showed essentially the same result.

Figure 6:
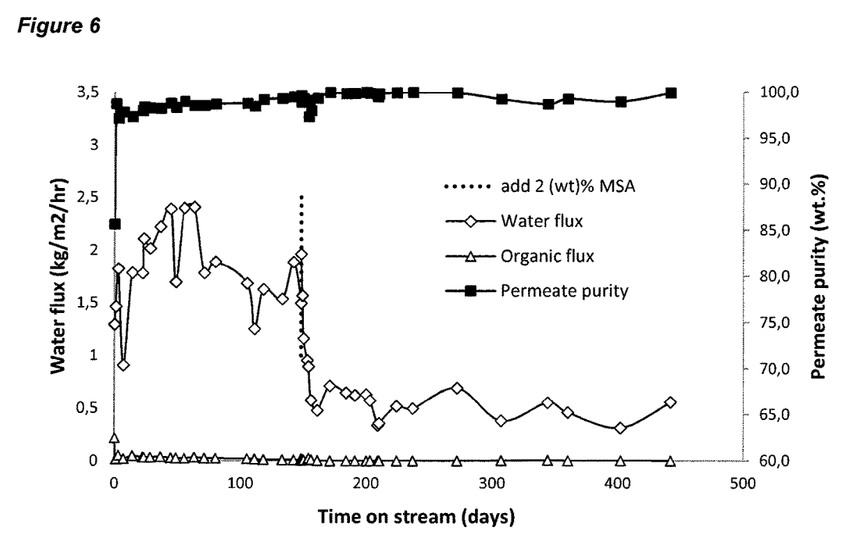
FIG. 6 shows the long-term water flux and the purity of the permeate of a membrane of the invention in the separation of a 90:10 $HAc/H_2O$ mixture without and with added methanesulfonic acid.

The membrane without the $\gamma$-alumina layer (FIG. 5) was tested in acetic acid and water of 90/10 wt % at 100° C. for 148 days. After this period 2 wt % of methanesulfonic acid was added to the feed mixture during operation. The membrane had a separation factor of more than 300 during the complete measurement period of 442 days. The results are shown in FIG. 6.

Example 2

Example 1 was repeated with the only difference that BTESM was used instead of BTESE. Two individual BTESM membranes were made and were tested in the dewatering acetic acid. The results are similar to those of Example 1.

REFERENCES CITED

Agirre, et al. 2012, *J Chem Technol Biotechnol* 87, 2012, 943-954

Aminabhavi et al. 2003: *Designed Monomers & Polymers,* 6 (3), 2003, 211-236
Campaniello et al. 2004: *Chem. Commun.* 2004, 834-835.
Castricum et al. 2008-a: *Chem. Commun.* 2008, 1103-1105; *J. Mater. Chem.* 2008, 18, 1-10
Castricum et al. 2008-b: *J. Membr. Sci.* 2008, 324 (1-2) 111
Iglesia et al. 2007: *Chemical Engineering Journal* 2007, 131 (1-3) 35-39
Ishida et al. 2006: *J. Chemical Engineering Japan* 2006, 38 (11): 903-907
Khajavi et al. 2010, *J, Membr. Sci.* 2010, 356 (1-2), 1-6
Kreiter et al. 2008: *J. Membrane Science* 2008, 319 (1-2): 126-132.
Kreiter et al. 2009: *ChemSusChem* 2009, 2(2), 158.
Masuda et al. 2003: *Separation and Purification Technology* 2003, 32: 181-189.
Sanz et al. 2006: *Chemical Engineering Journal* 2006, 123: 9-14.
Tsai et al. 2000: *J. Membrane Science* 2000, 169: 255-268
Tsuru et al. 2012: *J Membr. Sci.* http://dx.doi.org/10.1016/j.memsci.2012.06.012
Van Veen et al. 2011: *J. Membr. Sci.* 2011, 380, 124-31
Zhou et al. 2006-a: *Industrial & Engineering Chemistry Research* 2006, 45: 1787-1796.
Zhou et al. 2006-b: *Polymer* 2006, 47: 280-288.

The invention claimed is:

1. A supported membrane suitable for dewatering acidic mixtures, comprising a microporous separating layer and a macroporous ceramic support, wherein the microporous separating layer comprises a bridged organosilica directly applied on the macroporous ceramic support, in the absence of an intermediate mesoporous or finer layer, the bridged organosilica comprising divalent $C_1$-$C_9$ organic groups and/or trivalent $C_1$-$C_9$ organic groups directly bound to the silicon atoms of the organosilica.

2. The membrane according to claim 1, wherein the organosilica has the formula $Si_{(1-x)}M_xA^1_iA^2_jA^3_kO_{1.25-1.85}$, wherein:
   M is one or more metal(s);
   $A^1$ is a monovalent $C_1$-$C_9$ hydrocarbyl or fluorohydrocarbyl group;
   $A^2$ is a divalent organic group having the formula —$C_mH_n$;
   $A^3$ is a trivalent organic group having the formula —$C_mH_{(n-1)}$<;
   i=0-0.67;
   j=0-0.75;
   k=0-0.33,
   0.5<i+2j+3k<1.1; and 2j+3k>0.3;
   m=1-9 and n=2(m-p) and 0≤p<m, wherein the values m, n and p may be different between formulas $A^1$ and $A^2$;
   x=0-0.2.

3. The membrane according to claim 2, wherein one or more of the following values apply:
   $A^1$ is a monovalent $C_1$-$C_9$ hydrocarbyl group;
   i=0-0.33;
   j=0.25-0.5;
   k=0-0.1,
   m=1-6;
   x=0-0.1.

4. The membrane according to claim 3, wherein one or more of the following values apply:
   $A^1$ is a monovalent $C_1$-$C_4$ hydrocarbyl group;
   i=0-0.2;
   j=0.35-0.5;
   m=1-6;
   x=0-0.1.

5. The membrane according to claim 4, wherein one or both more of the following values apply:
   j=0.45-0.5;
   m=1 or 2.

6. The membrane according to claim 2, wherein $A^1$ has the formula $C_qH_rF_s$, wherein q=1-4, and r+s=2(q-t)+1 and 0≤t<q.

7. The membrane according to claim 1, wherein the macroporous support comprises a alumina.

8. The membrane according to claim 1, which has a stable water/acetic acid separation factor in the presence of 90% acetic acid in water at 100° C. of at least 100 for at least 120 days.

9. A process for producing a membrane of claim 1, wherein the membrane is suitable for dewatering acidic mixtures, comprising one or more cycles of (a) directly applying a bridged organosilica on a macroporous support in and (b) drying the support with the applied organosilica, until the membrane is essentially microporous, the bridged organosilica comprising divalent $C_1$-$C_9$ organic groups and/or trivalent $C_1$-$C_9$ organic groups directly bound to the silicon atoms of the organosilica.

10. The process according to claim 9, wherein the cycle of applying and drying of the organosilica is performed 2-4 times.

11. The process according to claim 9, further comprising (c) calcining the dried support with applied membrane.

12. The process according to claim 9, wherein the bridged organosilica is applied by hydrolysis of a precursor having the formula $(RO)_3Si$—$C_mH_n$—$Si(OR)_3$ and/or $(RO)_3Si\ C_mH_{(n-1)}[Si(OR)_3]_2$ wherein R is $C_1$-$C_4$-alkoxy, m=1-9 and n=2(m-p) and 0≤p<m.

13. The process according to claim 9, wherein the bridged organosilica further comprises monovalent groups of formula $C_qH_rF_s$, wherein q=1-4, and r+s=2(q-t)+1 and 0 ≤t<q, wherein the process comprises co-hydrolysis of a precursor having the formula $(RO)_3Si$-$C_qH_rF_s$, wherein R is $C_1$-$C_4$-alkoxy.

14. The process according to claim 9, wherein the macroporous support comprises α-alumina.

15. A process for dewatering an aqueous acidic mixture, comprising contacting a feed mixture containing at least water and an acid with a membrane according to claim 1 to obtain a permeate and a retentate, and recovering the retentate.

16. The process according to claim 15, wherein the feed mixture comprises 20-95 wt% of acid and 5-50 wt.% of water, and the retentate comprises less than 3% water.

17. The process according to claim 16, wherein the retentate comprises less than 1% water.

18. The process according to claim 15, wherein the acid comprises a carboxylic acid.

19. The process according to claim 15, wherein the acidic mixture results from the production of the acid.

20. The process according to claim 15, wherein the mixture results from an esterification process.

21. The process according to claim 19, wherein the mixture comprises between 20 and 80 wt.% of an alcohol and/or an ester of the acid and alcohol.

22. The process according to claim 15, wherein the mixture results from an acetalisation process.

23. The process according to claim 15, wherein the acidic mixture is a recycle stream in the production of another compound.

24. The process according to claim 15, wherein said contacting is performed at a temperature between 90 and 150° C.

* * * * *